(12) United States Patent
Tasaka et al.

(10) Patent No.: US 6,433,062 B1
(45) Date of Patent: Aug. 13, 2002

(54) THERMOPLASTIC ELASTOMERIC RESIN COMPOSITION AND A PROCESS FOR THE PREPARATION THEREOF

(75) Inventors: Michihisa Tasaka, Kawasaki; Akihiro Tamura, Tokyo, both of (JP)

(73) Assignee: Riken Vinyl Industry Co., Ltd., Tokyo (JP)

( * ) Notice: Subject to any disclaimer, the term of this patent is extended or adjusted under 35 U.S.C. 154(b) by 0 days.

(21) Appl. No.: 08/890,866

(22) Filed: Jul. 10, 1997

(30) Foreign Application Priority Data

Nov. 29, 1996 (JP) ............................................. 8-334855
Mar. 13, 1997 (JP) ............................................. 9-076706

(51) Int. Cl.⁷ .............................. C08J 3/00; C08K 5/01; C08L 9/00; C08L 47/00
(52) U.S. Cl. ...................... 524/484; 525/98; 525/192; 525/193; 525/194; 525/197
(58) Field of Search ................................ 525/192, 193, 525/194, 197, 98; 524/484

(56) References Cited

U.S. PATENT DOCUMENTS

| | | |
|---|---|---|
| 4,080,356 A | 3/1978 | Gergen et al. |
| 4,080,357 A | 3/1978 | Gergen et al. |
| 4,088,626 A | 5/1978 | Gergen et al. |
| 4,107,131 A | 8/1978 | Gergen et al. |
| 4,111,894 A | 9/1978 | Gergen et al. |
| 4,111,895 A | 9/1978 | Gergen et al. |
| 4,111,896 A | 9/1978 | Gergen et al. |
| 4,119,607 A | 10/1978 | Gergen et al. |
| 4,126,600 A | 11/1978 | Gergen et al. |
| 4,808,561 A | 2/1989 | Welborn |
| 5,191,052 A | 3/1993 | Welborn |
| 5,596,042 A * | 1/1997 | Itoh et al. ............... 525/98 |

FOREIGN PATENT DOCUMENTS

| | | |
|---|---|---|
| EP | 712892 | 5/1996 |
| EP | 810262 | 12/1997 |
| JP | 3-163088 | 5/1977 |
| JP | 58-215446 | 12/1983 |
| JP | 40-23798 | 10/1995 |
| JP | 08-225713 | 9/1996 |
| WO | WO 95/27756 | 10/1995 |
| WO | WO 95/33006 | 12/1995 |

\* cited by examiner

Primary Examiner—Patrick D. Niland
(74) Attorney, Agent, or Firm—Pitney, Hardin, Kipp & Szuch LLP

(57) ABSTRACT

The invention provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 40 to 240 parts by weight of a non-aromatic softening agent for rubber, (c) 5 to 300 parts by weight of polyethylene or a copolymer composed mainly of ethylene, and (d) 5 to 60 parts by weight of polypropylene or a copolymer composed mainly of propylene, characterized in that the process comprises the following steps:

(I) melt kneading the whole amounts of components (a), (b) and (d) and a part of component (c), and, at the same time or subsequently, melt kneading these with (f) an organic peroxide, and (II) melt kneading the product obtained from step (I) with the remaining part of component (c), and component (c) is one which has been prepared using a single site catalyst.

The obtained composition is soft and excellent in heat deformation resistance and mechanical strength, moldability and processability. The present invention also provide a thermoplastic elastomeric resin composition comprising the above components (a), (c) and (d) in an amount of 100 parts by weight, 5 to 150 parts by weight and 5 to 80 parts by weight, respectively. The composition is soft and excellent in heat deformation resistance and mechanical strength, moldability and processability and shows good results in the extraction tests.

8 Claims, No Drawings

THERMOPLASTIC ELASTOMERIC RESIN COMPOSITION AND A PROCESS FOR THE PREPARATION THEREOF

FIELD OF THE INVENTION

The present invention relates to a process for the preparation of a thermoplastic elastomeric resin composition.

The present invention also relates to a thermoplastic elastomeric resin composition.

PRIOR ART

Thermoplastic elastomeric resins which are rubber-like materials, do not need a vulcanization process and have thermoplastic resin-like molding processability are attracting attention in the fields of auto parts, parts for electric appliances, electric wire insulation, footwears and general goods, and in the is field of cap sealing materials.

Various types of such thermoplastic elastomeric resins have been developed and put on sale, such as polyolefine type, polyurethane type, polyester type, polystyrene type and polyvinyl chloride type.

Among those, polystyrene type thermoplastic elastomeric resins such as styrene-butadiene block copolymers (SBS) and styrene-isoprene block copolymers (SIS) and hydrogenated resins thereof have high softness and good rubber elasticity at normal temperature. Further, thermoplastic elastomeric resin compositions obtained from these show good processability.

However, these block copolymer compositions are unsatisfactory in compression set at a high temperature, particularly at 100° C. and, moreover, tensile properties deteriorate considerably at 80° C. or more. Thus, such compositions do not meet the levels of properties required in the fields of vulcanized rubber.

Meanwhile, the thermoplastic elastomers mentioned above are also attracting attention in the fields of cap sealing materials. Particularly, polyolefin type thermoplastic elastomers are used widely because of their high sanitary reliability and cheapness. However, these polyolefin type thermoplastic elastomers are poor in softness and, therefore, exhibit poor sealing property.

Alternatively, polystyrene type thermoplastic elastomeric resins such as SBS and SIS and hydrogenated resins thereof have high softness and good rubber elasticity at normal temperature. Further, thermoplastic elastomeric resin compositions obtained from these show good processability. Accordingly, these are used widely as an alternate of vulcanized rubber. However, these polystyrene type thermoplastic elastomer compositions cannot meet the n-heptane extraction test of the tests of Notification No. 20 of the Japanese Welfare Ministry, because softening agents such as paraffinic oil are generally added to these compositions in order to control their hardness. Accordingly, it is hard to use them as a cap sealing. Alternatively, if the paraffinic oil is not used, the softness and moldability of them deteriorate.

In order to solve such a drawback, there has been proposed a composition containing polybutene or polyisobutene as a softening agent. However, the composition disclosed are poor in heat resistance at 120° C.

Another resin compositions which comprise the block copolymer used as component (a) in the present invention has been proposed in Japanese Patent Application Laid-Open Nos. Sho-53-138451/1978, 53-138453/1978, 53-138454/1978, 53-138456/1978, 53-138458/1978, 53-138460/1978 and 53-138461/1978. However, heat resistance is poor.

The composition disclosed in Japanese Patent Application Laid-Open No. 58-215446/1983 comprises isotactic polypropylene. This composition is excellent in mechanical strength and heat resistance. However, the hardness is in the D hardness area. Thus, it cannot be said that the composition is excellent in sealing property.

SUMMARY OF THE INVENTION

A purpose of the invention is to provide a process for the preparation of a thermoplastic elastomer composition which is soft and excellent in heat deformation resistance, mechanical strength, moldability and processability.

The present inventors have noticed that an organic peroxide generate radicals, which then effect crosslinking of polyethylene and molecule cutting of polypropylene, particularly effect molecule cutting of polypropylene to deteriorate the physical properties in the elastomer composition obtained. We have now found that when a smallest amount of polypropylene needed for increasing the flowability during melting is added and an amount of polyethylene for obtaining proper dispersion is used, it is possible to enhance the crosslinking of polyethylene and dispersion of rubber component and to prepare the thermoplastic elastomer composition having excellent properties. This finding leads to the present invention.

Thus, the present invention provides a process for the preparation of a thermoplastic elastomeric resin composition comprising melt kneading (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer, (b) 40 to 240 parts by weight of a non-aromatic softening agent for rubber, (c) 5 to 300 parts by weight of polyethylene or a copolymer composed mainly of ethylene, and (d) 5 to 60 parts by weight of polypropylene or a copolymer composed mainly of propylene, characterized in that the process comprises the following steps:

(I) melt kneading the whole amounts of components (a), (b) and (d) and a part of component (c), and, at the same time or subsequently, melt kneading these with (f) an organic peroxide, and (II) melt kneading the product obtained from step (I) with the remaining part of component (c), and component (c) is one which has been prepared using a single site catalyst.

In a preferred embodiment, a weight ratio of the amount of component (c) used in step (I) and that in step (II) is 90:10 to 10:90.

In another preferred embodiment, component (f) is used in an amount of 0.1 to 1.5 parts by weight per 100 parts by weight of a total amount of components (a), (b), (c) and (d).

In another preferred embodiment. 0.1 to 3.5 parts by weight of a crosslinking aid per 100 parts by weight of a total amount of components (a), (b), (c) and (d) are used together with component (f) in step (I).

In another preferred embodiment, the whole amount of (e) at most 100 parts by weight of an inorganic filler is melt meaded in the initial stage of step (I).

In another preferred embodiment, (h) at most 3.0 parts by weight of an antioxidant per 100 parts by weight of a total amount of components (a), (b), (c) and (d) are used in step (I).

In another preferred embodiment, an additional amount of component (d) is added in step (II) and melt kneaded.

Another purpose of the invention is to provide a thermoplastic elastomer composition which is soft and excellent in heat deformation resistance, mechanical strength, moldability and processability and used properly as a sealing material.

Thus the present invention provides a thermoplastic elastomeric resin composition comprising (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer.

(c) 5 to 150 parts by weight of polyethylene or a copolymer composed mainly of ethylene, and (d) 5 to 80 parts by weight of polypropylene or a copolymer composed mainly of propylene, characterized in that component (c) is one which has been prepared using a single site catalyst.

In a preferred embodiment, the composition further comprises (b) 40 to 240 parts by weight of a non-aromatic softening agent for rubber.

In another preferred embodiment, the composition further comprises (e) 0.01 to 100 parts by weight of an inorganic filler.

PREFERRED EMBODIMENTS OF THE INVENTION

Component (a), Block Copolymer

Component (a) used in the invention is a block copolymer consisting of at least two polymeric blocks (A) composed mainly of a viny aromatic compound and at least one polymeric block (B) composed mainly of a conjugated diene compound, or a hydrogenated block copolymer obtained by hydrogenating said block copolymer, or a mixture thereof, such as vinyl aromatic compound-conjugated diene compound block copolymers having a structure, A—B—A, B—A—B—A or A—B—A—B—A, or those obtained by hydrogenating such. The block copolymer and/or the hydrogenated block copolymer (hereinafter referred to as (hydrogenated) block copolymer) contains 5 to 60% by weight, preferably 20 to 50% by weight, of a vinyl aromatic compound. Preferably, the polymeric block A composed mainly of a vinyl aromatic compound consists wholly of a vinyl aromatic compound or is a copolymeric block comprising more than 50% by weight, preferably at least 70% by weight, of a vinyl aromatic compound and an optional component such as a conjugated diene compound and/or a hydrogenated conjugated diene compound (hereinafter referred to as (hydrogenated) conjugated diene compound). Preferably, the polymeric block B composed mainly of a (hydrogenated) conjugated diene compound is composed solely of a (hydrogenated) conjugated diene compound or is a copolymeric block comprising more than 50% by weight, preferably at least 70% by weight, of a (hydrogenated) conjugated diene compound with an optional component such as a vinyl aromatic compound. The vinyl compound or the (hydrogenated) conjugated diene compound may be distributed at random, in a tapered manner (i.e., a monomer content increases or decreases along a molecular chain), in a form of partial block or mixture thereof in the polymeric block A composed mainly of a vinyl aromatic compound or the polymeric block B composed mainly of a (hydrogenated) conjugated diene compound, respectively. When two or more of the polymeric block A composed mainly of a vinyl aromatic compound or two or more of the polymeric block B composed mainly of a (hydrogenated) conjugated diene compound are present, they may be same with or different from each other in structure.

The vinyl aromatic compound to compose the (hydrogenated) block copolymer may be one or more selected from, for instance, styrene, α-methyl styrene, vinyl toluene and p-tert.-butyl styrene, preferably styrene. The conjugated diene compound may be one or more selected from, for instance, butadiene, isoprene, 1,3-pentadiene, and 2,3-dimethyl-1,3-butadiene, preferably butadiene and/or isoprene.

Any micro structure may be selected in the polymeric block B composed mainly of the conjugated diene compound. It is preferred that the butadiene block has 20 to 50%, more preferably 25 to 45%, of 1,2-micro structure. In the polyisoprene block, it is preferred that 70 to 100% by weight of isoprene is in 1,4-micro structure and at lest 90% of the aliphatic double bonds derived from isoprene is hydrogenated.

A weight average molecular weight of the (hydrogenated) block copolymer with the aforesaid structure to be used in the invention is preferably 5,000 to 1,500,000, more preferably 10,000 to 550,000, further more preferably 100,000 to 550,000, particularly 100,000 to 400,000. A number average molecular weight is preferably 5,000 to 1,500,000, more preferably 10,000 to 550,000, particularly 100,000 to 400,000. A ratio of the weight average molecular weight (Mw) to the number average molecular weight (Mn), Mw/Mn, is preferably 10 or less, more preferably 5 or less, particularly 2 or less.

Molecule structure of the (hydrogenated) block copolymer may be linear, branched, radial or any combination thereof.

Many methods were proposed for the preparation of such block copolymers. As described, for instance, in JP Publication 40-23798/1965, block polymerization may be carried out using a lithium catalyst or a Ziegler catalyst in an inert solvent. The hydrogenated block copolymer may be obtained by hydrogenating the block copolymer thus obtained in the presence of a hydrogenation catalyst in an inert solvent.

Examples of the (hydrogenated) block copolymer include SBS, SIS, SEBS and SEPS. A particularly preferred (hydrogenated) block copolymer in the invention is a hydrogenated block copolymer with a weight average molecular weight of 50,000 to 550,000 which is composed of polymeric block A composed mainly of styrene and polymeric block B which is composed mainly of isoprene and in which 70 to 100% by weight of isoprene has 1,4-micro structure and 90% of the aliphatic double bonds derived from isoprene is hydrogenated. More preferably, 90 to 100% by weight of isoprene has 1,4-micro structure in the aforesaid hydrogenated block copolymer.

Component (b), Non-Aromatic Softening Agent for Rubber

Non-aromatic mineral oils and non-aromatic liquid or low molecular weight synthetic softening agents may be used as component (b) of the invention. Mineral oil softening agents used for rubber are mixtures of aromatic cyclic ones, napthhenic cyclic ones and paraffinic ones. Those in which 50% or more of the whole carbon atoms is in paraffinic chains are called a paraffinic type, those in which 30 to 40% of the whole carbon atoms is in naphthenic rings are called a naphthenic type; and those in which 30% or more of the whole carbon atoms is in aromatic rings are called an aromatic type. Mineral oil softening agents for rubber to be used as component (b) according to the invention are preferably of the aforesaid paraffinic or naphthenic type. Aromatic softening agents are improper, because the dispersion in component (a) is poor. Paraffinic ones are preferred as component (b). Among the paraffinic ones, those with a less content of aromatic cyclic components are particularly preferred.

The non-aromatic softening agents for rubber have a kinetic viscosity at 37.8° C. of 20 to 500 cSt, a pour point of −10 to −15° C. and a flash point (COC) of 170 to 300° C.

Component (b) is blended in an amount of at most 240 parts by weight, preferably at most 180 parts by weight, and at least 40 parts by weight, preferably 80 parts by weight, per 100 parts by weight of component (a). If the amount exceeds the upper limit, bleedout of softening agent occurs easily and stickiness may be given to the final products in some cases and the mechanical properties deteriorate. If the amount is below the lower limit, there is no problem in practice, but a load to the extruder increases during the process and molecule cutting occurs due to exothermic shearing. The softness of the composition obtained deteriorates, too.

Component (c), Polyethylene or a Copolymer Composed Mainly of Ethylene

Which Is Prepared Using a Single Site Catalyst

As the polyethylene or a copolymer composed mainly of ethylene which is prepared using a single site catalyst, use may be made of one or more substances selected from polyethylene, for instance, high density polyethylene (polyethylene prepared in a low pressure method), low density polyethylene (polyethylene prepared in a high pressure method), linear low density polyethylene (copolymers of ethylene with a smaller amount, preferably 1 to 10 molar % of α-olefin such as butene-1, hexene -1 or octene-1); and olefinic copolymers such as ethylene-propylene copolymer, ethylene-vinyl acetate copolymer and ethylene-acrylate copolymer. Particularly preferable substances are ethylene-octene copolymer having a polymer density of at most 0.90 g/cm$^3$ or ethylene-hexene copolymer having a polymer density of at least 0.90 g/cm$^3$ which are prepared using a metallocene catalyst (single site catalyst). When Tm of these copolymer is not higher than 100° C., it is necessary to add and crosslink them by the time of crosslinking at the latest. Tm disappears by the crosslinking and, therefore, fusion of octene or hexene does not occur. If the addition of them is carried out after the crosslinking, fusion at 30 to 60° C. of octene or hexene remains and, therefore, the heat resistance is decreased.

The (co)polymer used as component (c) includes olefinic polymers which are prepared using a catalyst for olefine polymerization which is prepared in accordance with the method described in Japanese Patent Application Laid-Open Sho-61-296008/1986 and which is composed of a carrier and a reaction product of metallocene having at least one metal selected from the 4b group, 5b group and 6b group in the periodic table with alumoxane, the reaction product being formed in the presence of the carrier.

Another example of component (c) is an olefinic polymer prepared using a metal coordinated complex described in Japanese Patent Application Laid-Open Hei-3-163008, which metal coordinated complex contains a metal selected from the group 3 (except scandium), groups 4 to 10 and the lanthanoid group and a delocalized π-bonding part substituted by a constrained inducing part, and is characterized in that said complex has a constrained geometrical form around said metal atom, and a metal angle between a center of the delocalized substituted π-bonding part and a center of at least one remaining substituted part is less than that in a comparative complex which is different from it only in that a constrained inducing substituted part is substituted with a hydrogen, and wherein in each complex having further at least one delocalized substituted π-bonding part, only one, per metal atom, of the delocalized substituted π-bonding parts is cyclic.

The (co)polymer used as component (c) has an MFR determined at 190° C. and a load of 2.16 kg of preferably 0.1 to 10.0 g/10 min., more preferably 0.3 to 5.0 g/10 min. In the present composition, MFR of 0.3 to 2.0 g/10 min. is particularly preferred.

In the present process, component (c) is blended in an amount of at most 300 parts by weight, preferably at most 250 parts by weight, and preferably at least 5 parts by weight, per 100 parts by weight of component (a). If the amount is below the lower limit, the present effects cannot be obtained. If the amount exceeds the upper limit, softness of the elastomer composition obtained is lost and bleedout of softening agent (b) occurs easily.

In the present composition, component (c) is contained in an amount of at most 150 parts by weight, preferably at most 130 parts by weight, and preferably at least 5 parts by weight, more preferably at least 70 parts by weight, per 100 parts by weight of component (a). If the amount is below the lower limit, softness is lost. If the amount exceeds the upper limit, the heat resistance of the elastomer composition deteriorates.

Component (d), Polypropylene or a Copolymer Composed Mainly of Propylene

The polypropylene or a copolymer composed mainly of propylene attains an effect of improving dispersion of the rubber in the composition obtained so as to improve appearance of a molded article. Further, the heat resistance may be also improved. The component is an olefinic (co)polymer which is pyrolyzed by the heat treatment in the presence of peroxide to decrease its molecular weight and, therefore, its melting flowability increases. Examples of such include isotactic polypropylenes, and copolymers of propylene with other α-olefine such as ethylene, 1-butene, 1-hexene or 4-methyl-1-pentene.

Preferably, component (d) has Tm of 150 to 167° C. and ΔHm of 25 to 83 mJ/mg, as determined by DSC (differential scanning calorimetry) on its homopolymeric part. Crystallinity may be estimated from Tm and ΔHm. If Tm and ΔHm are out of the aforesaid ranges, rubber elasticity at 100° C. or higher of the elastomer composition obtained is not improved.

In the present process, component (d) has an MFR (ASTM D-1238, Condition L, 230° C.) of preferably 0.1 to 50 g/10 min., more preferably 0.5 to 20 g/10 min. If the MFR is less than 0.1 g/10 min., moldability of the elastomer composition obtained deteriorates. If it exceeds 50 g/10 min., rubber elasticity of the elastomer composition obtained deteriorates.

In the present process, component (d) is blended in an amount of at most 60 parts by weight, preferably at most 30 parts by weight, and at least 5 parts by weight, preferably at least 10 parts by weight, per 100 parts by weight of component (a). If the amount is less than the lower limit, moldability of the elastomer composition obtained deteriorates. If it exceeds the upper limit, the elastomer composition obtained is too hard and lacks softness, so that an article with rubber-like touch cannot be obtained and, further, bleedout is observed.

The component (d) may be added and melt kneaded after the melt kneading in the presence of an organic peroxide to control the hardness of the composition or to control moldability such as appearance or shrinkage. In this case, component (d) has an MFR (ASTM D-1238, Condition L, 230° C.) of preferably 0.1 to 200 g/10 min., more preferably 0.5 to 60 g/10 min. If the MFR is not within the above range, the aforesaid drawbacks occur. The amount in this case is at most 50 parts by weight, preferably at most 20 parts by weight, and at least 5 parts by weight, preferably at least 10 parts by weight, per 100 parts by weight of component (a). If the amount is less than the lower limit, adjustment of moldability of the elastomer composition obtained is insufficient. If it exceeds the upper limit, the elastomer composition obtained is too hard and lacks softness, so that an article with rubber-like touch cannot be obtained.

In the present elastomer composition, component (d) is contained in an amount of 5 to 80 parts by weight, preferably 30 to 50 parts by weight, per 100 parts by weight of component (a). If the amount is below the lower limit, the moldability of the elastomer composition was poor. If the amount exceeds the upper limit, the softness and rubber elasticity of the elastomer composition deteriorate.

Component (e), Inorganic Filler

Inorganic fillers may be blended, if needed. The fillers improve some physical properties, such as compression set of a molded article, and further offer an economical advantage as an extender. Any conventional inorganic fillers may be used, such as calcium carbonate, talc, magnesium hydroxide, mica, clay, barium sulfate, natural silica, synthetic silica (white carbon), titanium oxide, and carbon black. Among those, calcium carbonate and talc are particularly preferred, which meet the test of Notification No. 20 of the Japanese Welfare Ministry.

The inorganic filler may be blended in an mount of at most 100 parts by weight per 100 parts by weight of component (a). If the amount exceeds 100 parts by weight, mechanical strength of the elastomer composition obtained is very low and, further, its hardness is so high that its flexibility is lost and an article with rubber-like touch cannot be obtained. In addition, the moldability deteriorates.

Component (f), Organic Peroxide

An organic peroxide enhances the crosslinking of component (c) and molecule cutting of component (d) to increase flowability of the composition during melt kneading and, therefore, makes dispersion of a rubber component good. Examples of the organic peroxides used in the invention include dicumyl peroxide, di-tert.-butyl peroxide, 2,5-dimethyl-2,5-di(tert.-butylperoxy)hexane, 2,5-dimethyl-2,5-di(tert.-butylperoxy)hexine-3, 1,3-bis(tert.-butylperoxyisopropyl)benzene, 1,1-bis(tert.-butylperoxy)-3,3,5-trimethylcyclohexane, n-butyl-4,4,-bis(tert.-butylperoxy)valerate, benzoylperoxide, p-chlorobenzoyl peroxide, 2,4-dichlorobenzoyl peroxide, tert.-butylperoxy benzoate, tert.-butylperoxyisopropyl carbonate, diacetyl peroxide, lauroyl peroxide, and tert.-butylcumyl peroxide. Among those, most preferred are 2,5-dimethyl-2,5-di(tert.-butylperoxy)hexane and 2,5-dimethyl-2,5-di(tert.-butylperoxy)hexine-3 in terms of smell, coloring and scorch stability.

The amount of component (f) added is determined with consideration of the amounts of the aforesaid components (a) to (e) and, particularly, the quality of the thermoplastic elastomer obtained. It is blended preferably in an amount of at most 1.5 parts by weight, particularly at most 1.0 parts by weight, and preferably at least 0.1 part by weight, per 100 parts by weight of a total amount of components (a) to (d). If the amount is more than the upper limit, the moldability becomes worse, while it is less than the lower limit, it tends not to attain sufficient crosslinking and, therefore, the heat resistance and mechanical strength of the elastomer obtained becomes worse.

Component (g), Crosslinking Aid

In the crosslinking treatment in the presence of the organic peroxide in the process for the preparation of a thermoplastic elastomer composition according to the invention, a crosslinking aid may be blended and thereby uniform and effective crosslinking reaction may be carried out. Examples of the crosslinking aid include polyvalent vinyl monomers such as divinylbenzene, triallylcyanurate, vinyl butylate and vinyl stearate and polyvalent methacrylate monomers such as ethyleneglycol dimethacrylate, diethyleneglycol dimethacrylate, triethyleneglycol dimethacrylate, polyethyleneglycol dimethacrylate, trimethylolpropane trimethacrylate and ally methacrylate, and diallyl esters of orthophthalic acid, isophthalic acid or terephthalic acid. Among these, triethylengloycol dimethacrylateis particularly preferred, because this is easy to handle and attains a well compatibility with component (c), a main component in the composition, and this has a solubilizing action for the peroxide to act as a dispersion aid for the peroxide, so that the crosslinking action in the heat treatment is uniform and efficient to give a cross-linked thermoplastic elastomer with a good balance between hardness and rubber elasticity.

The amount of the crosslinking aid blended is also determined with consideration of the amounts of the aforesaid components (a) to (e) and, particularly, the quality of the thermoplastic elastomer obtained. It is blended preferably in an amount of at most 3.5 parts by weight, particularly at most 2.5 parts by weight, and preferably at least 0.1 part by weight, per total 100 parts by weight of components (a) to (d). If the amount is more than the upper limit, a degree of crosslinking tends to decrease because of self polymerization, while it is less than the lower limit, it tends not to attain the effect of this material sufficiently.

Component (h), Antioxidant

Antioxidant may also be added, if needed, such as phenolic antioxidant such as 2,6-di-tert.-butyl-p-cresol, 2,6-di-tert.-butylphenol, 2,4-di-methyl-6 -tert.-butylphenol, 4,4-dihydroxydiphenyl, and tris(2-methyl-4-hydroxy-5-tert.-butylphenyl)butane, phosphite type antioxidants and thioether type antioxidants. Among those, the phenolic antioxidants and the phosphite type antioxidants are preferred.

The amount of the antioxidant is preferably 3 parts by weight or less, more preferably 1 part by weight or less, per total 100 parts by weight of components (a) to (d).

In the present invention, it is possible to blend various conventional additives such as anti-blocking agents, sealing property-improving agents, heat stabilizers, light stabilizers, UV absorbers, lubricants, nucleating agents and colorants in addition to the aforesaid components, depending on the applications.

The present process will be further explained hereinafter. The present process comprises the following steps:

(I) melt kneading the whole amounts of components (a), (b) and (d) and optionally component (e) and a part of component (c), and, at the same time or subsequently, melt kneading these with (f) an organic peroxide, and (II) melt kneading the product obtained from step (I) with the remaining part of component (c).

In the present process, component (c) is portionwise added and melt kneaded in steps (I) and (II). A weight ratio of the amount of component (c) used in step (I) and that in step (II) is preferably 90:10 to 10:90, more preferably 50:50 to 20:80. If the amount melt kneaded in step (I) is too much, a load to the extruder increases during the process because of an excess proceeding of crosslinking and molecule cutting occurs due to exothermic shearing. Moreover, dispersion of component (c) deteriorates so that this affects adversely the properties of the elastomer composition obtained. If the amount melt kneaded in step (I) is too little, proper crosslinking cannot be obtained.

When component (g), crosslinking aid, mentioned above is used, it is preferably melt kneaded together with component (f), organic peroxide in step (I), whereby the aforesaid effects may be attained.

Next, one embodiment of the present process will be described. For example, the whole amounts of components (a), (b) and (d) and component (e), if used, and a part of component (c) are melt kneaded, together with optional additives such as an antioxidant, a light stabilizer, a pigment, a flame retardant and a lublicant. The means for melt kneading are not restricted to particular ones and any conventional means may be used, such as single screw extruders, twin screws extruders, rolls, Banbury mixers, and various kneaders. A melt kneading temperature is preferably 160 to 180° C. Next, component (f) and preferably component (g) are added to the product obtained by this melt kneading and melt kneaded together, whereby partial crosslinking of component (c) may be attained. The melt kneading may be carried out generally on, for example, twin screws extruders or Banbury mixers. Subsequently, the remaining part of component (c) and, if desired, component (d) is further added to the product obtained by this melt kneading and melt kneaded. A melt kneading temperature for crosslinking is preferably 180 to 240° C., more preferably 180 to 220° C. This melt kneading may be carried out using, for example, single screw extruders, twin screws extruders, rolls, Banbury mixers, and various kneaders. For example, when a twin screws extruder with an L/D ratio of 47 or more or a Banbury mixer is used, it is possible to carry out the aforesaid process continuously.

The thermoplastic elastomeric resin composition of the present invention will be further explained hereinafter.

The present elastomer composition comprises 100 parts by weight of composnent (a), 5 to 150 parts by weight of component (c) and 5 to 80 parts by weight of component (d). These components are described specifically hereinbefore.

The present composition may contain any other components mentioned above, if needed.

The present composition may be prepared by melt kneading the aforesaid components (a), (c) and (d) in any order or at the same time.

EXAMPLES

The present invention is further elucidated with reference to the following Examples and Comparison Examples, which is not intended to limit the invention. The evaluation methods used were as follows:

1) Hardness: determined in accordance with the Japanese Industrial Standards (JIS) K 7215. Pressed sheets having a thickness of 6.3 mm were used as test pieces.

2) Tensile strength: determined in accordance with JIS K 6301 using a test piece which was obtained by punching out a pressed sheet having a thickness of 1 mm by a No. 3 dumbbell die. The tensile speed was 500 mm/min. In Examples 1 to 5 and Comparison Examples 1 to 10, the test temperature was room temperature (23° C.), 60° C. or 80° C.

3) Tensile elongation: determined in accordance with JIS K 6301 using a test piece which was obtained by punching out a pressed sheet having a thickness of 1 mm by a No. 3 dumbbell die. The tensile speed was 500 mm/min.

4) Stress at 100% elongation: determined in accordance with JIS K 6301 using a test piece which was obtained by punching out a pressed sheet having a thickness of 1 mm by a No. 3 dumbbell die. The tensile speed was 500 mm/min.

5) Impact resilience: determined in accordance with BS903 using a pressed sheet having a thickness of 4 mm as a test piece.

6) Compression set: determined in accordance with JIS K 6262 using a pressed sheet having a thickness of 6.3 mm as a test piece. Conditions: 25% deformation at 100° C.×70 hrs in Examples 1 to 5 and Comparison Examples 1 to 10, or at 125° C.×1 hr in Examples 6 to 11 and Comparison Examples 11 to 17.

7) Tearing strength: determined in accordance with JIS K 6301 using a test piece which was obtained by punching out a pressed sheet having a thickness of 2.5 mm by a B type dumbbell die. The tensile speed was 500 mm/min.

8) Oil resistance: determined in accordance with JIS K 6301 using a test piece which was obtained by punching out a pressed sheet having a thickness of 1 mm by a No. 3 dumbbell die. ASTM No. 2 oil was used. Tensile strength retained and elongation retained were measured after dipping at 100° C.×24 hrs. The tensile speed was 500 mm/min.

9) Moldability: determined by molding a composition into a sheet of 12.5×13.5×1 mm on a 120 tons injection molding machine in the following conditions:

molding temperature: 220° C., mold temperature: 40° C., injection rate: 55 mm/sec., injection pressure: 1400 kg /cm$^2$, holding pressure: 400 kg /cm$^2$, injection time: 6 seconds, cooling time: 45 seconds, It was observed whether delamination, deformation or flow marks which extremely deteriorated appearance was present or not.

⊚: very good

○: good

×: bad

10) Extraction tests: carried out according to the test of Notification No. 20 of the Japanese Welfare Ministry, using a pressed sheet having a thickness of 1.0 mm as a test piece.

Test items:

Oily foods elution test (eluting solution: n- heptane),

Aqueous foods elution test (eluting solution: water),

Alcohol elution test (eluting solution: 20% ethanol), and

Determination of the amount of potassium permanganate consumed by the eluted product.

11) Bleed-out property: the molded sheet obtained from (9) was compressed by 50% under the conditions of 100° C.×22 hrs. It was observed whether bleeding or blooming of low molecular weight substances was visually observed or not, and whether stickiness was felt or not in tough by fingers.

603 : good

33 : bad

12) DSC, determined as follows:

The aforesaid molded article was cut to obtain an about 20 mg piece. This was used as a sample for the determination of DSC. DSC was determined using a DSC220C, SII, ex Seiko Electronic Industries Ltd., in a range of −50° C. to 200° C. at a rate of 10° C./min. to obtain glass transition temperature, $Tg_1$, melting point, $Tm_1$ and $Tm_2$, and crystallization temperature, $Tc_1$ and $Tc_2$, wherein $Tm_1$ and $Tc_1$ are attributed to polyethylene and $Tm_2$ and $Tc_2$ to polypropylene.

13) Gloss: determined in accordance with JIS Z 8741 on the aforesaid molded article. The larger the values are, the more smooth the surface is, and the smaller the values are, the more rough the surface is.

Materials used:

Component (a): hydrogenated block copolymer, Septon 4077, ex. Kuraray Inc., styrene content: 30% by weight, isoprene content: 70% by weight, number average molecular weight: 260,000, weight average molecular weight: 320,000, molecular weight distribution: 1.23, and hydrogenation ratio: at least 90%.

Component (b): softening agent for rubber, Diana Process Oil, PW-90, ex Idemitsu Kosan Co., weight average molecular weight: 539, paraffinic carbon content: 71%, and naphthenic carbon content: 29%.

Component (c):

(c-1) ethylene-octene copolymer, Engage EG8150, trade mark, ex

Dow Chemical Japan Inc., density: 0.868 g/cm$^3$, melt index, determined at 190° C. and a load of 2.16 kg: 0.5 g/10 min.

(c-2) ethylene-hexene copolymer, SP2520, trade mark, ex Mitsui

Petrochemical Industries Inc., density: 0.928 g/cm$^3$, melt index, determined at 190° C. and a load of 2.16 kg 1.7 g/10 min.

(c-3) polyethylene for comparison, which had not been prepared with a single site catalyst, V-0398CN, trade mark, ex Idemitsu Petrochemical Co., density: 0.907 g/cm$^3$, melt index, determined at 190° C. and a load of 2.16 kg 3.3 g/10 min.

Component (d): propylene homopolymer, PP CJ700, ex Mitsui Petrochemical Industries Inc., crystallization degree: Tm 166° C., ΔHm 82 mJ/mg, Component (e) inorganic filler, calcium carbonate, RS400, trade mark, ex Sankyo Seihun Co., used in Examples 1 to 5 and Comparison Examples 1 to 10.

talc, JA13R, ex Asada Seihun Co.

used in Examples 6 to 11 and Comparison Examples 11 to 17.

Component (f) organic peroxide

KayahexaAD, trade mark, ex Kayaku Akzo Co.

Component (g) crosslinking aid

NK ester 3G, trade mark, ex Shin-Nakamura Chemical Co., type triethylene glycol dimethacrylate Component (h): antioxidant Irganox B220, trade mark, ex Nippon Ciba-Geigy Examples 1 to 5 and Comparison Examples 1 to 10

Each component was used in the amount indicated in Tables 1 and 3 in part by weight. First, the whole amounts of components (a), (b), (d), (e) and (h) and a part of component (c), which amount is indicated before symbol "+" in Tables 1 and 3, were charged all together into a twin-screw extruder with an L/D of 62.5 and started to be melt kneaded at a kneading temperature of 180 to 240° C. and a screw rotation speed of 350 rpm. Next, the whole amounts of components (f) and (g) were side fed and the melt kneading was still continued. Subsequently, the remaining part of component (c), which amount is indicated after symbol "+" in Tables 1 and 3, was side fed, melt kneaded and pelletized. The pellets obtained were put in a predetermined mold and then pressed in the conditions of 220° C. and 50 kg/cm$^2$ to prepare each sheet for the aforesaid evaluation methods (1) to (8). For the evaluation methods (9), (11), (12) and (13), the pellets thus obtained were injection molded in the conditions described in evaluation method (9) and subjected to each test.

The results are as shown in Tables 2 and 4.

TABLE 1

| Component, | Example | | | | |
|---|---|---|---|---|---|
| part by weight | 1 | 2 | 3 | 4 | 5 |
| (a) | 100 | 100 | 100 | 100 | 100 |
| (b) | 150 | 150 | 140 | 140 | 150 |
| (c-1) | 30 + 0 | 10 + 0 | 10 + 0 | 10 + 0 | 30 + 0 |
| (c-2) | 50 + 25 | 50 + 25 | 50 + 50 | 50 + 100 | 50 + 25 |
| (d) | 15 | 15 | 15 | 15 | 15 |
| (e) | 60 | 60 | 60 | 60 | 0 |
| (f)* | 0.75 | 0.75 | 0.75 | 0.75 | 0.75 |
| (g)* | 1.35 | 1.35 | 1.35 | 1.35 | 1.35 |
| (h)* | 0.4 | 0.4 | 0.4 | 0.4 | 0.4 |

*per 100 parts by weight of the total amount of components (a) to (d).

TABLE 2

| Properties | Example | | | | |
|---|---|---|---|---|---|
| of the composition | 1 | 2 | 3 | 4 | 5 |
| Specific gravity | 0.98 | 0.98 | 0.99 | 0.98 | 0.90 |
| Hardness, after HDA 15 seconds | 58 | 65 | 69 | 80 | 75 |

TABLE 2-continued

| Properties of the composition | Example | | | | |
|---|---|---|---|---|---|
| | 1 | 2 | 3 | 4 | 5 |
| Tensile strength, MPa | | | | | |
| 23° C. | 9.5 | 11.9 | 13.1 | 15.1 | 12.4 |
| 60° C. | 1.5 | 1.8 | 2.1 | 3.5 | 2.0 |
| 80° C. | 0.5 | 0.7 | 1 | 1.6 | 0.7 |
| Tensile elongation, % | 910 | 780 | 840 | 850 | 1180 |
| Stress at 100% elongation, MPa | 1.5 | 2.1 | 2.2 | 3.1 | 2.0 |
| Tearing strength, kN/m | 27 | 35 | 37 | 42 | 35 |
| Impact resilience, % | 42 | 41 | 41 | 40 | 55 |
| Compression set, % | 63 | 63 | 66 | 68 | 82 |

TABLE 2-continued

| Properties of the composition | Example | | | | |
|---|---|---|---|---|---|
| | 1 | 2 | 3 | 4 | 5 |
| Oil resistance | | | | | |
| Tensil strength retained, % | 8 | 10 | 12 | 15 | 10 |
| Elongation retained, % | 11 | 12 | 13 | 14 | 14 |
| Moldability | ○ | ○ | ○ | ○ | ○ |
| leedout property | ○ | ○ | ○ | ○ | ○ |
| Results of DSC, ° C. | | | | | |
| $Tg_1$ | 29.4 | — | — | — | — |
| $Tm_1$ | 115.5 | — | — | — | — |
| $Tm_2$ | — | — | — | — | — |
| $Tc_1$ | 86.6 | — | — | — | — |
| $Tc_2$ | 102.3 | — | — | — | — |
| Gloss, % | 37 | — | — | — | — |

TABLE 3

| Component, part by weight | Comparison Example | | | | | | | | | |
|---|---|---|---|---|---|---|---|---|---|---|
| | 1 | 2 | 3 | 4 | 5 | 6 | 7 | 8 | 9 | 10 |
| (a) | 100 | 100 | 100 | 100 | 100 | 100 | 100 | 100 | 100 | 100 |
| (b) | 150 | 20 | 250 | 140 | 140 | 140 | 140 | 140 | 150 | 150 |
| (c-1) | 30 + 0 | 10 + 0 | 10 + 0 | 3 + 0 | 10 + 0 | 10 + 0 | 10 + 0 | 10 + 0 | 30 + 0 | — |
| (c-2) | 50 + 25 | 50 + 100 | 50 + 100 | 0 | 50 + 300 | 50 + 50 | 50 + 50 | 50 + 50 | 75 + 0 | — |
| (c-3) for comparison | — | — | — | — | — | — | — | — | — | 105 |
| (d) | 15 | 15 | 15 | 15 | 15 | 0 | 80 | 15 | 15 | 15 |
| (e) | 60 | 60 | 60 | 60 | 60 | 60 | 60 | 150 | 60 | 60 |
| (f)* | 0 | 0.75 | 0.75 | 0.75 | 0.75 | 0.75 | 0.75 | 0.75 | 0.75 | 0.75 |
| (g)* | 0 | 1.35 | 1.35 | 1.35 | 1.35 | 1.35 | 1.35 | 1.35 | 1.35 | 1.35 |
| (h)* | 0.4 | 0.4 | 0.4 | 0.4 | 0.4 | 0.4 | 0.4 | 0.4 | 0.4 | 0.4 |

*per 100 parts by weight of the total amount of components (a) to (d).

TABLE 4

| Properties of the composition | Comparison Example | | | | | | | | | |
|---|---|---|---|---|---|---|---|---|---|---|
| | 1 | 2 | 3 | 4 | 5 | 6 | 7 | 8 | 9 | 10 |
| Specific gravity | 0.98 | 1 | 0.94 | 0.99 | 0.96 | 0.99 | 0.98 | 1.08 | 0.98 | 0.98 |
| Hardness, after HDA 15 seconds | 59 | 93 | 54 | 48 | 91 | 58 | 83 | 80 | 63 | 65 |
| Tensile strength, MPa | | | | | | | | | | |
| 23° C. | 15.5 | 18.5 | 9.8 | 7.2 | 19.8 | 4.8 | 11.9 | 3.2 | 7.5 | 12.0 |
| 60° C. | 0.3 | — | — | — | 4.8 | — | 2 | — | — | — |
| 80° C. | 0 | — | — | — | 2 | — | 1.1 | — | — | — |
| Tensile elongation, % | 800 | 230 | 450 | 480 | 790 | 80 | 670 | 240 | 650 | 480 |
| Stress at 100% elongation, MPa | 1.3 | 5.3 | 1.8 | 1.2 | 5.2 | — | 4.2 | 2.8 | 1.5 | 2.1 |
| Tearing strength, kN/m | 30 | 62 | 30 | — | 74 | 15 | 51 | 12 | 35 | 27 |
| Impact resilience, % | 46 | 35 | 38 | — | 34 | 40 | 36 | 25 | 41 | 42 |
| Compression set, % | 67 | 83 | 70 | — | 72 | 73 | 68 | 80 | 55 | 63 |
| Oil resistance | | | | | | | | | | |
| Tensile strength retained, % | 0 | — | — | — | 31 | — | 18 | 10 | 18 | 10 |
| Elongation retained, % | 0 | — | — | — | 65 | — | 23 | 5 | 15 | 12 |
| Moldability | ○ | X | ○ | X | ○ | X | ○ | X | ○ | Δ |
| Bleedout property | ○ | ○ | X | ○ | X | ○ | X | ○ | ○ | ○ |
| Results of DSC, ° C. | | | | | | | | | | |
| $Tg_1$ | 28.2 | — | — | — | — | — | — | — | — | — |
| $Tm_1$ | 116.7 | — | — | — | — | — | — | — | — | — |
| $Tm_2$ | 157.4 | — | — | — | — | — | — | — | — | — |
| $Tc_1$ | 87.2 | — | — | — | — | — | — | — | — | — |

TABLE 4-continued

| | Comparison Example | | | | | | | | | |
|---|---|---|---|---|---|---|---|---|---|---|
| Properties of the composition | 1 | 2 | 3 | 4 | 5 | 6 | 7 | 8 | 9 | 10 |
| $Tc_2$ | 102.8 | — | — | — | — | — | — | — | — | — |
| Gloss, % | — | — | — | — | — | — | — | — | — | 10 |

The resin composition in Example 1 was prepared according to the process of the present invention, while one in Comparison Example 1 was prepared in the same conditions as in Example 1, except that components (f) and (g) were not added. It was found that the oil resistance was very low in Comparison Example 1. From the results of DSC determination, in Example 1, the melting temperature of polyethylene, $Tm_1$, decreased and the melting temperature of polypropylene, $Tm_2$, disappeared. The crystallization temperatures of polyethylene and polypropylene, $Tc_1$ and $Tc_2$, respectively, decreased slightly. From these data, it is considered that some interaction between polyethylene and polypropylene occured, whereby a state near partial compatibility one was obtained, The glass transition temperature, $Tg_1$, increased, and become considerably high in Example 1. It is considered that this was due to the considerable phase separation of crystal and non-crystal parts of polyethylene, as a result of the process of the present invention.

In Examples 2 to 4, the amount of component (c) added was varied. All of the compositions exhibited good characteristic values. It was found that the larger the amount was, the better the characteristic values were. The composition in Example 5 did not contain component (e). It also exhibited good characteristic values.

Meanwhile, in Comparison Example 2, the amount of component (b) added was below the range of the present invention. The tensile strength was very low and the moldability was poor. In Comparison Example 3, the amount of component (b) added was above the range of the present invention. The tensile elongation was very low and bleedout occured considerably. In Comparison Example 4, the amount of component (c) added was below the range of the present invention and was introduced all into the extruder in the former kneading step. The tensile elongation was very low and the moldability was poor. In Comparison Example 5, the amount of component (c) added was above the range of the present invention. The bleedout property was poor. In Comparison Example 6, component (d) was not blended. The tensile elongation was very low and the moldability was poor. In Comparison Example 7, the amount of component (d) added was above the range of the present invention. The tensile elongation was low and the bleedout property was poor. In Comparison Example 8, the amount of component (e) added was above the range of the present invention. The tensile elongation, tearing strength, impact resilience and oil resistance were poor and the moldability was also poor. In Comparison Example 9, wherein the composition was same as in Example 1, all of the components was melt kneaded all together. The tensile strength and tensile elongation were lower than those in Example 1. It was found that the hardness was high and softness decreased. In Comparison Example 10, use was made of a normal polyethylene which had not been polymerized by a single site catalyst, in place of component (c) in Example 1. The tensile elongation was lower, the hardness was higher and the softness decreased, compared to those in Example 1. It was also found that the gloss decreased considerably and thus the brightness on the surface of the molded article deteriorated extremely. It is considered that this is caused by poor dispersibility of the resins, compared to Example 1.

Examples 6 to 11

In Examples 6 to 11, components (a), (c) and (d) and optionally (e) were charged all together into a twin-screw kneader, kneaded at a kneading temperature of 180 to 240° C. and a screw rotation speed of 100 rpm and pelletized. The pellets obtained were put in a predetermined mold and pressed in the conditions of 220° C. and 50 kg/cm² to prepare sheets for the aforesaid evaluation methods (1) to (6). The results are as shown in Table 5.

Comparison Examples 11 to 12

The same procedures were repeated as in the aforesaid Examples, except that each of the following polyethylenes which had been polymerized without using a single site catalyst was used in place of component (c).

Polyethylene for Comparison Example 11,
    V-0398CN, ex ldemitsu Petrochemical Co.,
    type: HDPE (high density polyethylene)
    density: 0.907 g/cm³
    melt index, determined at 190° C. and a load of 2.16 kg: 3.3 g/10 min.

Polyethylene for Comparison Example 12,
    440M, ex Idemitsu Petrochemical Co.,
    type : LLDPE (linear low density polyethylene)
    density: 0.954 g/cm³
    melt index, determined at 190° C. and a load of 2.16 kg: 1.0 g/10 min The results are as shown in Table 5.

TABLE 5

| | Ex. 6 | Ex. 7 | Ex. 8 | Ex. 9 | Ex. 10 | Ex. 11 | Comp. Ex. 11 | Comp. Ex. 12 |
|---|---|---|---|---|---|---|---|---|
| Component (a) | 100 | 100 | 100 | 100 | 100 | 100 | 100 | 100 |
| Component (c), c-1 | 100 | 100 | 100 | 130 | 70 | 100 | 100 | 100 |
| Component (d) | 30 | 45 | 60 | 45 | 45 | 45 | 45 | 45 |
| Component (e) | | | | | 20 | | | |
| Specific gravity | 0.89 | 0.89 | 0.89 | 0.89 | 0.89 | 0.92 | 0.9 | 0.92 |

TABLE 5-continued

|  | Ex. 6 | Ex. 7 | Ex. 8 | Ex. 9 | Ex. 10 | Ex. 11 | Comp. Ex. 11 | Comp. Ex. 12 |
|---|---|---|---|---|---|---|---|---|
| Hardness, after HDA 15 seconds | 70 | 77 | 84 | 86 | 87 | 79 | 96 | 50* |
| Tensile strength, MPa | 28 | 33 | 38 | 32 | 43 | 30 | 24 | 28 |
| Tensile elongation, % | 560 | 570 | 590 | 580 | 600 | 530 | 530 | 230 |
| Stress at 100% elongation, MPa | 3.5 | 4 | 5 | 4.5 | 5.4 | 3.8 | 2.8 | 4.2 |
| Impact resilience, % | 60 | 58 | 55 | 56 | 58 | 54 | 42 | 40 |
| Compression set (125° C. × 1 hr), % | 44 | 47 | 50 | 61 | 56 | 44 | 80 | 90 |
| Moldability | ⊚ | ⊚ | ⊚ | ⊚ | ⊚ | ⊚ | ○ | X |
| Residue after evaporation of n-heptane, ppm | 80 | 80 | 80 | 100 | 60 | 70 | 70 | 70 |
| Residue after evaporation of water, ppm | 0 | 0 | 0 | 0.5 | 0 | 0 | 0 | 0 |
| Residue after evaporation of 20% ethanol, ppm | 10 | 10 | 9 | 2 | 9 | 8 | — | — |
| Potassium permanganate, ppm | 0.3 | 0.3 | 0.2 | 0.8 | 0.2 | 0.3 | 0.5 | 1 |

*represented by D hardness; the others were represented by A hardness.

Comparison Examples 13 to 17

The same procedures were repeated as in the aforesaid Examples, except that components (a), (c), (d) and (e) were used in an amount exceeding or below the range of the present invention. The results are as shown in Table 6.

TABLE 6

|  | Comp. Ex. 13 | Comp. Ex. 14 | Comp. Ex. 15 | Comp. Ex. 16 | Comp. Ex. 17 |
|---|---|---|---|---|---|
| Component (a) | 100 | 100 | 100 | 100 | 100 |
| Component (c), c-1 | 100 | 100 | 3 | 180 | 100 |
| Component (d) | 3 | 100 | 45 | 45 | 45 |
| Component (e) |  |  |  |  | 120 |
| Specific gravity | 0.89 | 0.89 | 0.89 | 0.89 | 1.05 |
| Hardness, after HDA 15 seconds | 65 | 94 | 90 | 79 | 93 |
| Tensile strength, MPa | 25 | 35 | 46 | 33 | 4.5 |
| Tensile elongation, % | 630 | 550 | 630 | 600 | 60 |
| Stress at 100% elongation, MPa | 2.5 | 8.5 | 7 | 4 | — |
| Impact resilience, % | 55 | 41 | 55 | 58 | 25 |
| Compression set (125° C. × 1 hr), % | 95 | 92 | 42 | 90 | — |
| Moldability | X | ○ | ○ | ○ | X |
| Residue after evaporation of n-heptane, ppm | 120 | 110 | 80 | 130 | — |
| Residue after evaporation of water, ppm | 0.6 | 0.3 | 0 | 0.3 | — |
| Residue after evaporation of 20% ethanol, ppm | 3 | 2 | 5 | 3 | — |
| Potassium permanganate, ppm | 0.9 | 0.3 | 0.2 | 0.5 | — |

What is claimed is:

1. A process for the preparation of a thermoplastic elastomeric resin composition comprising melt kneading
   (a) 100 parts by weight of a block copolymer consisting of at least two polymeric blocks (A) composed mainly of a vinyl aromatic compound and at least one polymeric block (B) composed mainly of a conjugated diene compound, and/or a hydrogenated block copolymer obtained by hydrogenating said block copolymer,
   (b) 40 to 240 parts by weight of a non-aromatic softening agent for rubber,
   (c) 5 to 300 parts by weight of polyethylene or a copolymer composed mainly of ethylene, and
   (d) 5 to 60 parts by weight of polypropylene or a copolymer composed mainly of propylene,
characterized in that the process comprises the following steps:
   (I) melt kneading the whole amounts of components (a), (b) and (d) and a part of component (c), and, at the same time or subsequently, melt kneading these with (f) an organic peroxide, and
   (II) melt kneading the product obtained from step (I) with the remaining part of component (c), and component (c) is one which has been prepared using a single site catalyst.

2. The process as described in claim 1, wherein a weight ratio of the amount of component (c) used in step (I) and that in step (II) is 90:10 to 10:90.

3. The process as described in claim 1, wherein component (f) is used in an amount of 0.1 to 1.5 parts by weight per 100 parts by weight of a total amount of components (a), (b), (c) and (d).

4. The process as described in claim 1, wherein 0.1 to 3.5 parts by weight of a crosslinking aid per 100 parts by weight of a total amount of components (a), (b), (c) and (d) are used together with component (f) in step (I).

5. The process as described in claim 1, wherein the whole amount of
   (e) at most 100 parts by weight of an inorganic filler is melt meaded in the initial stage of step (I).

6. A thermoplastic elastomeric resin composition heat-crosslinked in the presence of an organic peroxide comprising
   (a) 100 parts by weight of a block copolymer consisting of at least two polymeric block (A) composed mainly of a vinyl aromatic compound and at least one polymeric block (B) composed mainly of a conjugated diene compound, and/or a hydrogenated block copolymer obtained by hydrogenating said block copolymer, (c) 5 to 150 parts by weight of polyethylene or a copolymer composed mainly of ethylene, and (d) 5 to 80 parts by weight of polypropylene or a copolymer composed mainly of proplyene, characterized in the component (c) is one which has been prepared using a single site catalyst.

7. The thermoplastic elastomeric resin composition as described in claim 6, wherein the composition further comprises (b) 40 to 240 parts by weight of a non-aromatic softening agent for rubber.

8. The thermoplastic elastomeric resin composition as described in claim 6, wherein the composition further comprises (e) 0.01 to 100 parts by weight of an inorganic filler.

* * * * *